N. BROWN & U. TRUDEAU.
TROLLEY WHEEL GUARD.
APPLICATION FILED SEPT. 30, 1916.
1,236,905.
Patented Aug. 14, 1917.
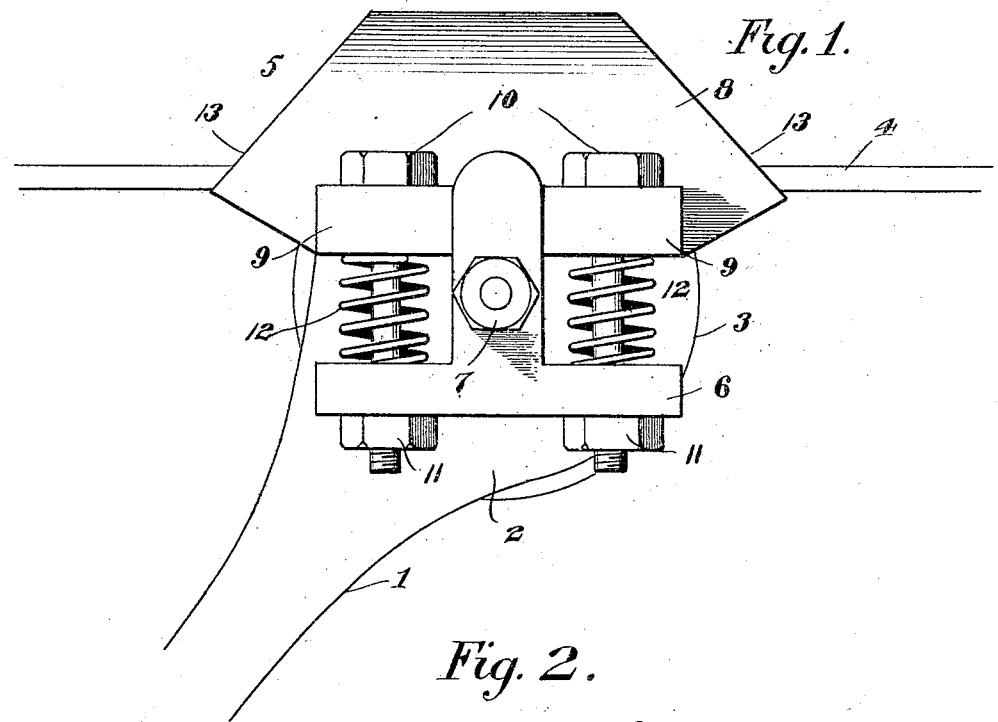
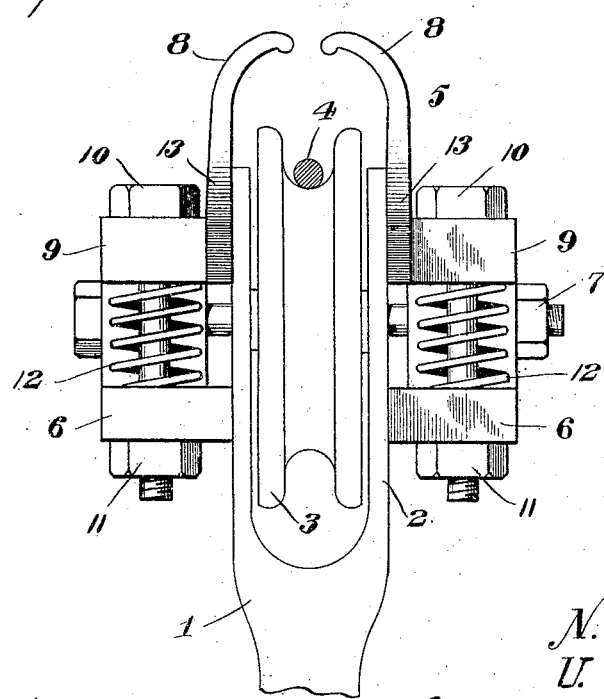
Witnesses
H. Hindrudge
Inventor
N. Brown
U. Trudeau.
By Victor J. Evans
Attorney

UNITED STATES PATENT OFFICE.

NATHANIEL BROWN AND ULDERIC TRUDEAU, OF MANCHESTER, NEW HAMPSHIRE.

TROLLEY-WHEEL GUARD.

1,236,905.   Specification of Letters Patent.   Patented Aug. 14, 1917.

Application filed September 30, 1916. Serial No. 123,166.

*To all whom it may concern:*

Be it known that we, NATHANIEL BROWN and ULDERIC TRUDEAU, citizens of the United States, residing at Manchester, in the county of Hillsborough and State of New Hampshire, have invented new and useful Improvements in Trolley-Wheel Guards, of which the following is a specification.

This invention relates to certain novel and useful improvements in trolley wheel guards.

In carrying out the present invention, it is our purpose to provide a trolley wheel guard whereby accidental displacement of the trolley wheel from the wire will be prevented, and which will operate automatically to open position when the trolley wheel passes a switch plate or crossing plate in the trolley wire so that the trolley wheel may pass such plate.

It is also our purpose to provide a trolley wheel guard which may be readily attached to any type of trolley harp and which will operate effectively under all conditions.

With the above and other objects in view, the invention consists in the construction, combination and arrangement of parts hereinafter set forth in and falling within the scope of the claim.

In the accompanying drawings;

Figure 1 is a view in side elevation of a trolley wheel guard constructed in accordance with the present invention, the same being shown in applied position.

Fig. 2 is an end view of the same.

Referring now to the drawing in detail, 1 designates the upper end portion of a trolley pole equipped with the usual harp 2 in which is rotatably mounted the trolley wheel 3 that engages the trolley wire 4.

Our improved trolley guard is indicated as an entirety by the numeral 5 and comprises complementary inverted T-shaped blocks 6 arranged upon opposite sides of the trolley harp and having the stems thereof formed with alining openings through which the outer ends of the axle of the trolley wheel project and threaded upon the outer ends of the axle of the trolley wheel are nuts 7 that act to hold the blocks 6 against the sides of the trolley harp. Formed in the lower horizontal section of each block 6 adjacent to the outer ends thereof are vertical openings, while arranged above the axle of the trolley wheel and disposed upon the opposite sides of the harp are shields 8 curved inwardly toward each other above the trolley wheel to substantially inclose the upper portion of the trolley wheel. The outer surface of each shield 8 adjacent to the lower edge thereof is formed with outwardly extending lugs 9 arranged upon opposite sides of the vertical section of the block and these lugs 9 are formed with openings that aline with the vertical openings in the horizontal section of the block. Through these vertically alining openings are passed bolts 10 having the lower ends equipped with nuts 11 and encircling the bolts 10 between the lugs 9 and the horizontal section of the block are coiled expansion springs 12 that act to hold the shields 8 normally in elevated position. The forward and rear edges of the shields 8 are inclined as at 13 so that when the trolley wheel approaches a switch plate or crossing plate the inclined edges 13 may engage such plate to force the shields downwardly against the action of the springs 12 in the continued movement of the trolley wheel, thereby permitting the shields to pass under the switch wire or the intersecting wire.

In practice, the springs 12 hold the shields normally in elevated position so that the upper portion of the trolley wheel will be practically enveloped by the shields, thereby preventing accidental disconnection of the trolley wheel from the wire, particularly when rounding curves and traveling at high speed on a straight track. When the trolley wheel passes a switch plate or crossing plate, the inclined edges of the shields engage such plate, thereby lowering the shields against the action of the springs, as previously described.

We claim:

In a trolley wheel guard, inverted T-shaped blocks secured to the opposite sides of the trolley harp, shields arranged upon opposite sides of the trolley harp and normally enveloping the upper portion of the wheel, lugs on the lower edges of said shields respectively upon opposite sides of the vertical sections of said blocks, bolts passed through said lugs and the horizontal sections of said blocks, springs encircling said bolts respectively between said lugs and horizontal sections and adapted to permit the shields to move downwardly to inactive position, the front and rear edges of said shields being inclined to move the shields downwardly when the trolley wheel passes a switch plate or crossing plate.

In testimony whereof we affix our signatures.

NATHANIEL BROWN.
ULDERIC TRUDEAU.